United States Patent
Cunningham et al.

(10) Patent No.: US 10,895,206 B2
(45) Date of Patent: Jan. 19, 2021

(54) METHOD AND SYSTEM FOR ENGINE IDLE SPEED CONTROL

(71) Applicant: Ford Global Technologies, LLC, Dearborn, MI (US)

(72) Inventors: Ralph Cunningham, Milan, MI (US); Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 114 days.

(21) Appl. No.: 16/201,619

(22) Filed: Nov. 27, 2018

(65) Prior Publication Data
US 2020/0165987 A1 May 28, 2020

(51) Int. Cl.
| | | |
|---|---|---|
| F02D 31/00 | (2006.01) | |
| F02D 11/02 | (2006.01) | |
| B60W 20/00 | (2016.01) | |
| B60K 6/40 | (2007.10) | |
| B60K 6/54 | (2007.10) | |
| B60K 6/387 | (2007.10) | |
| B60H 1/00 | (2006.01) | |

(52) U.S. Cl.
CPC ........... *F02D 31/001* (2013.01); *B60W 20/00* (2013.01); *F02D 11/02* (2013.01); *B60H 1/00* (2013.01); *B60K 6/387* (2013.01); *B60K 6/40* (2013.01); *B60K 6/54* (2013.01); *B60W 2710/065* (2013.01); *B60Y 2200/92* (2013.01); *F02D 2200/602* (2013.01)

(58) Field of Classification Search
CPC .. F02D 31/001; F02D 11/02; F02D 2200/602; F02D 41/021; F02D 41/083; F02D 29/02; B60W 20/00; B60W 2710/065; B60W 30/18018; B60W 10/06; B60W 10/18; B60W 10/30; B60W 2510/0657; B60W 2510/0666; B60W 2510/0638; B60K 6/40; B60K 6/54; B60K 6/387; B60Y 2200/92; B60H 1/00
See application file for complete search history.

(56) References Cited

U.S. PATENT DOCUMENTS

| | | | | |
|---|---|---|---|---|
| 5,547,438 | A * | 8/1996 | Nozaki ................. | F16H 61/143 477/169 |
| 5,666,917 | A | 9/1997 | Fraser et al. | |
| 7,094,176 | B2 * | 8/2006 | Budal .................... | B60K 28/16 477/107 |
| 9,039,570 | B2 * | 5/2015 | Doering .............. | B60W 10/023 477/86 |
| 10,054,073 | B2 * | 8/2018 | Waite, III ............. | F02D 41/022 |
| 10,479,343 | B2 * | 11/2019 | Frait ...................... | F16H 61/47 |

(Continued)

FOREIGN PATENT DOCUMENTS

| | | | | |
|---|---|---|---|---|
| JP | 2000310326 | A * | 11/2000 | ........ B60W 30/1882 |
| WO | WO-2014104698 | A1 * | 7/2014 | ........ B60W 30/1882 |

*Primary Examiner* — David Hamaoui
(74) *Attorney, Agent, or Firm* — Geoffrey Brumbaugh; McCoy Russell LLP (57) ABSTRACT

Methods and systems are provided for improving fuel economy by opportunistically lowering engine idle speed below a base idle speed when electrical loads are not present. A hydraulic brake pressure is increased when the idle speed is raised, in anticipation of vehicle propulsion. The brake pressure counteracts any creep torque and unintended vehicle acceleration resulting from the rising engine idle speed.

7 Claims, 4 Drawing Sheets

(56) References Cited

U.S. PATENT DOCUMENTS

2015/0191168 A1\* 7/2015 Mitsuyasu .............. F02D 29/02
 701/54
2015/0336583 A1  11/2015 Pursifull et al.
2016/0016562 A1  1/2016 McKnight et al.

\* cited by examiner

METHOD AND SYSTEM FOR ENGINE IDLE SPEED CONTROL

FIELD

The present description relates generally to methods and systems for controlling a vehicle engine idle speed to improve vehicle fuel economy.

BACKGROUND/SUMMARY

Vehicle control systems may be configured for engine idle speed control (ISC). While low engine idle speeds are known to improve fuel economy, there may be a number of constraints that are placed on the ISC that force a higher than desired engine idle speed. These may include constraints pertaining to meeting emissions requirements and maintaining acceptable driveability while providing fuel economy. The load applied on the engine by various engine-powered vehicle components, such as an alternator, an AC compressor, and an automatic transmission oil pump, contributes significantly to the engine idle speed control. In particular, the engine speed is set to a worst case minimum idle speed that can meet each of the worst case alternator loading, the worst case transmission pump loading, and the worst case AC compressor loading. The loading of still other accessory vehicle components may also be taken into account. Further still, the control system may try to lower engine idle speed while avoiding engine stall as a result of an unexpected load on the engine. As a result, the engine idle speed may be set to a higher speed than would be desired for fuel economy.

One example approach for improving ISC is shown by Fraser et al. in U.S. Pat. No. 5,666,917. Therein, the control system utilizes preview control and appropriate engine modeling to maximize the benefit of advance information, so as to better set the engine idle speed when the engine is subjected to a disturbance torque.

However, the inventors herein have recognized potential issues with such an approach. As one example, an additional constraint in engine idle speed control is the requirement to not allow substantial engine idle speed variation. In particular, even if the engine idle speed were lowered based on a more accurate estimate of the accessory loading, a controller may not allow engine idle speed to be increased at a substantial rate because it can result in unintended vehicle motion or acceleration. In addition, variations in idle speed can be particularly noticeable to vehicle occupants since the engine is operating at a relatively low speed and external distractions, such as road noise or wind noise, are typically negligible or minimal.

In one example, the issues described above may be addressed by a method for a vehicle, comprising: while a vehicle is idling with an engine running, adjusting engine speed to a value that is less than the engine speed required to maintain engine electrical load; and in response to a brake pedal being released, increasing the engine speed while concurrently increasing a hydraulic brake pressure independent of operator brake input. As a result, a vehicle controller may ensure that a present brake line pressure is sufficient to counteract any motion caused by the increased torque transmitted from the higher engine speed through the torque converter and to the tires (in a road grade dependent manner). In this way, a higher rate of engine idle speed increase can be enabled while any associated unintended vehicle acceleration is addressed via brake actuation.

As one example, responsive to a vehicle idling condition, such as where a vehicle is held stationary with an accelerator pedal released and a brake pedal applied (such as at a traffic light), an engine idle speed can be lowered to a sub-idle speed that is set to be lower than a minimum engine idle speed based on worst case power and torque requirements of the AC compressor, alternator, transmission oil pump, and other auxiliary loads. In one example, the sub-idle speed is set to be 400 rpm (in comparison with a typical idling speed of 600 rpm). In response to an indication that the vehicle is about to be launched, such as responsive to brake pedal release, the engine speed may be raised from the sub-idle speed to a "ready to accelerate" idle speed, such as from 400 rpm to 700 rpm, at a rapid rate. In addition, despite the brake pedal being released and no brake pedal input being received, a brake hydraulic pressure may be increased to mitigate unintended vehicle motion during the rapid increase in engine idle speed. In one example, the hydraulic brake pressure profile may be adjusted to counteract the creep torque from the increase in engine idle speed.

Typically, engine control systems do not apply a low engine idle speed to reduce the possibility of an engine stall. However, in the present invention, a lower engine idle speed is applied while taking advantage of vehicles designed with start/stop capabilities, and their ability to detect and restart the engine in the event of a stall. This greatly lowers the consequences of an engine stall. In addition, a starter system can be included that provides engine torque even before the engine speed drops to zero. This allows for a lower-than-previously tenable idle speed.

The present description may provide several advantages. In particular, the approach may provide improved vehicle fuel economy by enabling a lowering of engine idle speed below levels required to be maintained based on actual or predicted engine power and torque requirements at idling conditions. By raising the idle speed in response to a brake pedal release, and increasing the brake hydraulic pressure while the engine speed is increased, the technical effect achieved is that unintended acceleration can be addressed. Specifically, the hydraulic brake pressure can be raised at a rate that counteracts the creep torque generated from the rapidly rising engine idle speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
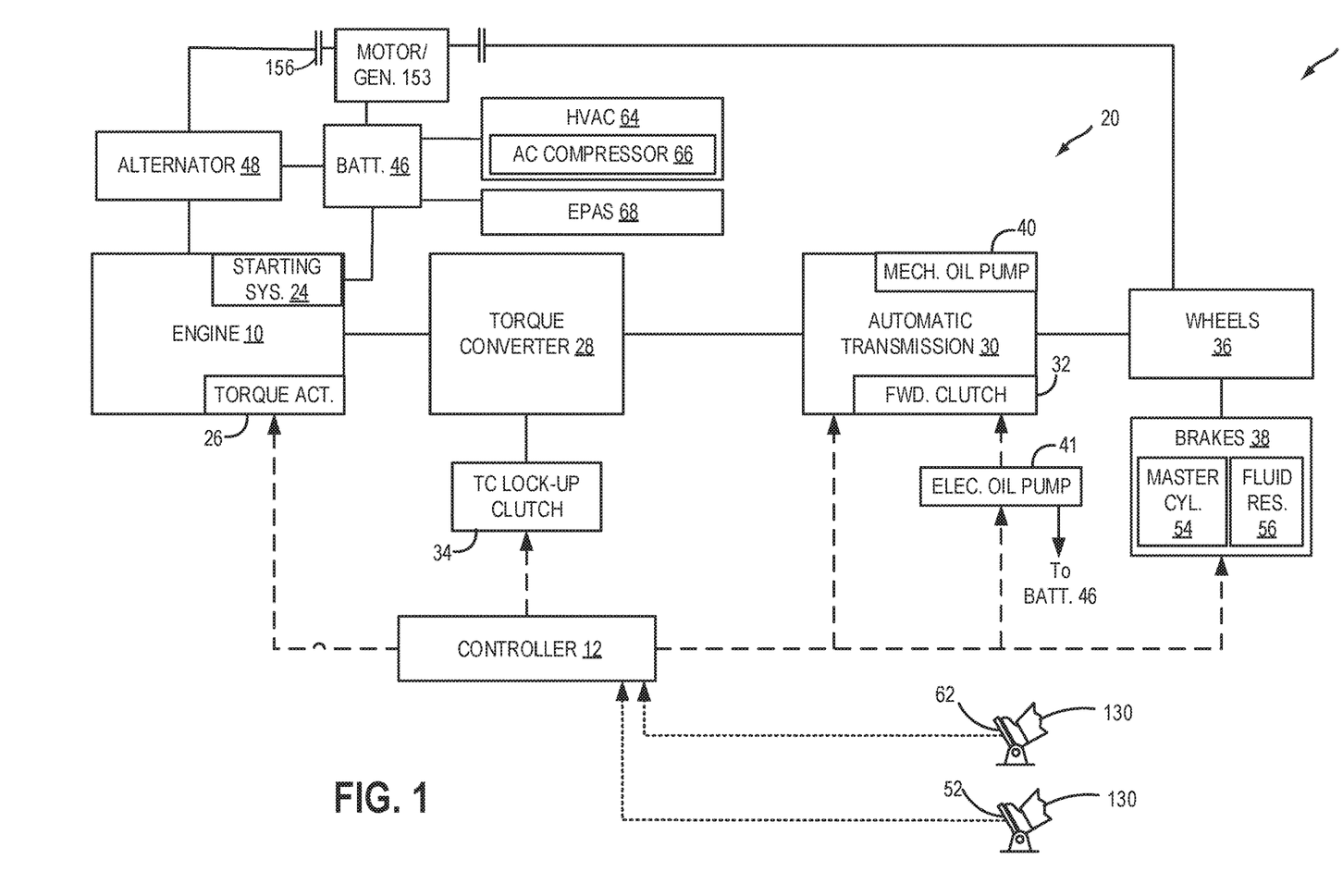
FIG. 1 shows details of an example hybrid electric vehicle drive-train.
Figure 3:
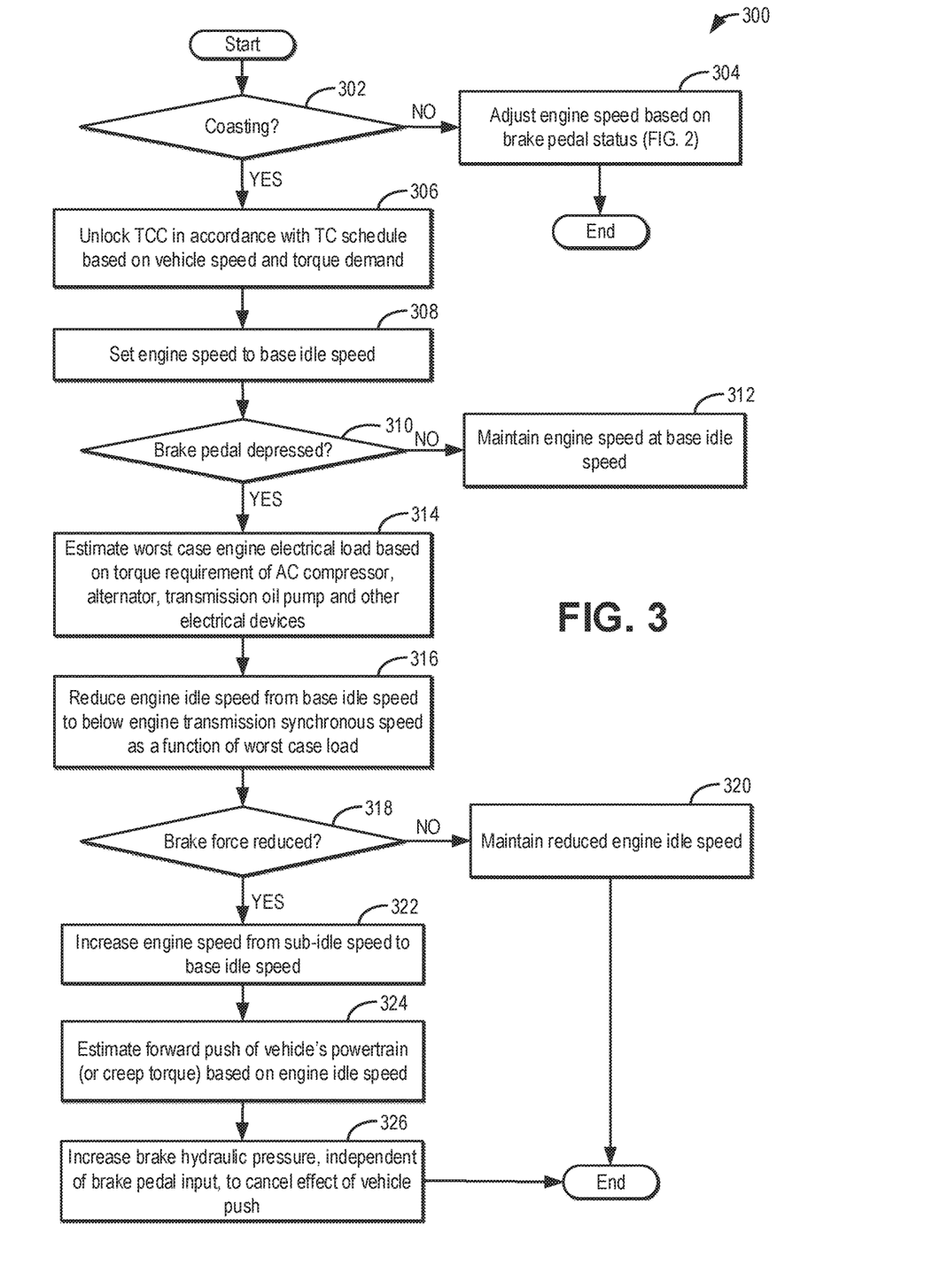
FIG. 3 shows a high level flow chart of an example method for adjusting engine idle speed while a vehicle is coasting.
Figure 4:
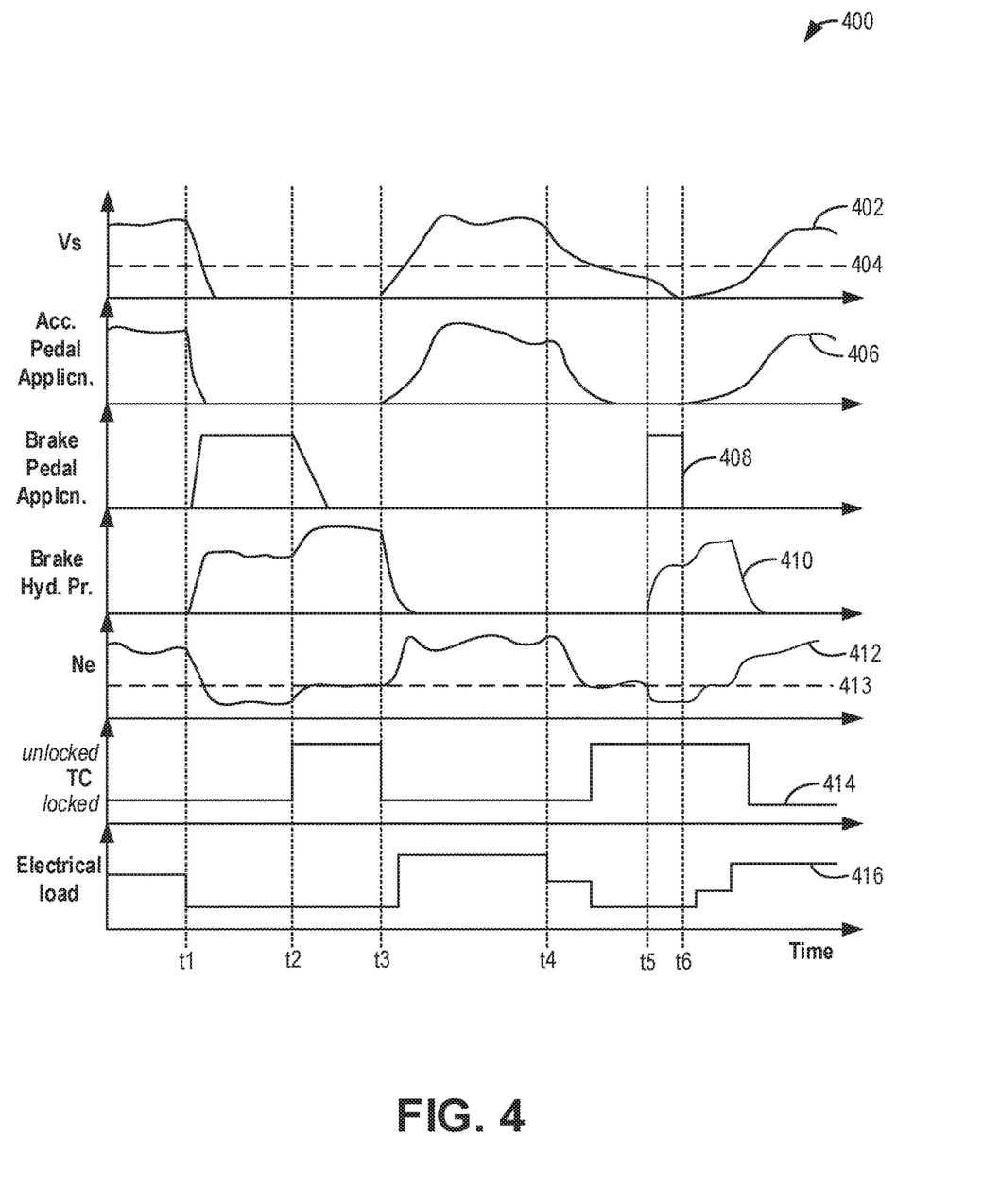
FIG. 4 shows a prophetic example of engine idle speed adjustments.

The following description relates to systems and methods for improving fuel economy in a vehicle system, such as the system of FIG. 1, by reducing engine idle speed opportunistically. An engine controller may execute a control routine, such as the example routine of FIG. 2, to lower the engine idle speed below a base idle speed during conditions when an accelerator pedal is released and a brake pedal is applied. The idle speed may be lowered below the base idle speed based on the actual or predicted electrical load on the engine. When the brake pedal is released, the idle speed may be raised to the base speed to allow for a quick vehicle acceleration. Concurrently, hydraulic brake pressure may be increased, while the brake pedal input decreases, to counteract creep torque generated from the rapid rise in engine idle speed. A similar approach idle speed control routine may be performed during vehicle coasting in coordination with transmission engine synchronous speed, as shown at FIG. 3. FIG. 4 shows a prophetic example of lowering engine idle speed to sub-idle levels based on engine electrical load to improve fuel economy.

FIG. 1 is a block diagram of a drive-train 20 of a vehicle 5. Drive-train 20 may be powered by engine 10. Engine 10 may be started with an engine starting system 24, including a battery powered electrical starter motor. The starter motor may be configured to support engine restart at or below a predetermined near zero threshold speed (for example at or below 100 rpm). Alternatively, the predetermined threshold speed may be a speed range, for example 50 to 100 rpm. The starter motor may be operated in response to a current received from a system electrical power supply, such as battery 46. In response to an engine restart request, current may be directed from the battery to the starter motor to crank the engine, following which application of the current may be discontinued. In one example, an engine restart request may be inferred in response to a vehicle operator 130 releasing their foot from brake pedal 52. In another example, an engine restart request may be inferred in response to the vehicle operator 130 applying their foot to depress accelerator pedal 62.

Engine 10 may also generate or adjust torque via torque actuator 26, which may be a fuel injector, throttle, etc. Engine 10 may be coupled to a transmission, depicted herein as automatic transmission 30, via a torque converter 28. Specifically, the engine output torque may be transmitted to torque converter 28 to drive the automatic transmission 30. Further, one or more transmission gear clutches may be engaged, including forward clutch 32, to propel vehicle 5. A plurality of gear clutches, in addition to forward clutch 32, may be included in transmission 28 and may be engaged as needed to activate a plurality of fixed transmission gear ratios.

The torque converter 28 may be referred to as a component of the transmission 30. The output of the torque converter 28 may, in turn, be controlled by torque converter lock-up clutch (TCC) 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged (or slipped), thereby enabling the amount of torque relayed to the transmission to be adjusted. A controller may be configured to adjust the amount of torque transmitted by torque converter 28 by adjusting a degree of slip of the torque converter lock-up clutch in response to various engine operating conditions such as engine speed and vehicle speed, or based on a driver-based engine operation request.

Torque output from the automatic transmission 30 is relayed to wheels 36 to propel the vehicle. Specifically, automatic transmission 30 may transfer an input driving torque at the input shaft (not shown) responsive to a vehicle traveling condition before transmitting an output driving torque to the wheels. Further, a frictional force may be applied to wheels 36 by engaging wheel brakes 38 coupled to the vehicle wheels. The wheel brakes 38 may be actuated in response to control signals sent from controller 12, the control signals generated in response to operator actuation of brake pedal 52. In one example, wheel brakes 38 may be engaged in response to the driver, or vehicle operator 130 pressing his foot on a brake pedal 52. In the same way, a frictional force may be reduced to wheels 36 by disengaging wheel brakes 38 in response to the vehicle operator 130 releasing his foot from the brake pedal 52.

In the depicted example, wheel brakes 38 are configured as a hydraulic brake system including a master cylinder 54 and a hydraulic brake fluid reservoir 56. In the hydraulic brake system, when the brake pedal is depressed, a pushrod exerts force on the piston(s) in the master cylinder 54, causing fluid from the brake fluid reservoir 56 to flow into a pressure chamber through a compensating port. This results in an increase in the pressure of the entire hydraulic system, forcing fluid through the hydraulic lines toward one or more calipers where it acts upon one or more caliper pistons sealed by one or more seated O-rings. The resulting increase in hydraulic brake pressure causes the brake caliper pistons to apply a force on brake pads, pushing them against s spinning rotor, the friction between the pads and the rotor causes a braking torque to be generated which slows the vehicle. In alternate embodiments, such as where a drum brake is included, the brake fluid enters a wheel cylinder and presses one or two brake shoes against the inside of the spinning drum. When the brake pedal is released, spring(s) in the master cylinder assembly return the master piston(s) back into position. This action first relieves the hydraulic pressure on the caliper, then applies suction to the brake piston in the caliper assembly, moving it back into its housing and allowing the brake pads to release the rotor. In this way, an increase in hydraulic brake pressure is correlated with an increase in wheel brake torque applied at the vehicle wheels via the wheel brakes, and a resulting drop in vehicle speed. And similarly, a decrease in hydraulic brake pressure is correlated with a decrease in wheel brake torque applied at the vehicle wheels via the wheel brakes, and a resulting rise in vehicle speed.

In still further examples, a position of the brake pedal may be inferred from the brake pressure. In one example, where the brake is coupled to an anti-lock brake system (ABS), the brake pressure may be estimated by the ABS and transmitted from the ABS controller to the engine controller over a controller area network (CAN) as a brake pressure or brake torque signal. Additionally, a brake on/off signal, associated with the signal to the brake lights, may be generated. The brake on/off signal may be used in conjunction with the brake pedal position information to signal the end of a brake pedal travel (or brake pedal event). It will be appreciated that in alternate embodiments, the position of the brake pedal may be determined by a brake pedal position sensor coupled to the brake pedal. During some conditions, the release of the foot from the wheel brake pedal may also indicate an intention of the driver to restart and possibly launch the vehicle.

A mechanical oil pump 40 may be in fluid communication with automatic transmission 30 to provide hydraulic pressure to engage various clutches, such as forward clutch 32 and/or torque converter lock-up clutch 34. The mechanical oil pump 40 may be operated in accordance with torque converter 28, and may be driven by the rotation of the engine or transmission input shaft, for example. Thus, the hydraulic flow rate or pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump. Electric oil pump 41 may be driven by an electric motor (not shown) to which an electric power may be supplied, for example by battery 46.

Vehicle system components outside of the drivetrain may include an alternator 48 configured to convert the mechanical energy generated while running engine 10 to electrical energy for storage in battery 46. One or more auxiliary electrical loads may be coupled to engine 10. These may include, for example, electric power assist steering system (EPAS) 68 and a heating ventilation and air conditioning (HVAC) system 64 for heating and/or cooling a vehicle cabin, etc. HVAC system 64 may include an AC compressor 66. Still other electrical loads may be coupled to engine 10. During engine idling conditions, an engine idle speed may be adjusted as a function of the electrical load required to be maintained and/or the anticipated electrical load. For example, if cabin cooling is demanded when the engine is in the idling condition, a higher engine idle speed is required to meet the AC compressor load. As another example, if the vehicle is stationary and idling at a traffic signal while a traffic light is red, and a significant steering event is anticipated when the traffic light turns green, a higher engine idle speed is provided to meet the anticipated steering load. As elaborated at FIG. 2, controller 12 may be configured to provide a minimum engine idle speed that meets the worst case load requirement (actual or anticipated) of the auxiliary electrical loads. This minimum engine idle speed may be lowered below a base idle speed as the electrical load requirement decreases. Then, when the vehicle is ready to be launched, the idle speed may be quickly raised while hydraulic brake pressure is increased, without operator brake pedal input, to counteract any creep torque generated from the rapidly rising idle speed.

The controller 12 receives signals from various sensors coupled to the vehicle components of FIG. 1 and employs the various actuators of FIG. 1 to adjust engine operation based on the received signals and instructions stored on a memory of the controller. The various sensors may include, for example, engine speed sensors, manifold pressure and flow sensors, various temperature and pressure sensors, such as a hydraulic brake pressure sensor, ambient humidity, temperature and barometric pressure sensors, engine coolant temperature sensors, pedal position sensors coupled to the brake and accelerator pedals, etc. The various actuators may include, for example, a cylinder fuel injector, an air intake throttle, wheel brakes, turbine of a turbocharger in a boosted engine configuration, etc. Controller 12 may be configured to receive inputs from engine 10 and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. As another example, responsive to a brake pedal being released while a vehicle is idling, the controller may send a signal to increase a hydraulic brake pressure while raising an engine idle speed.

In some examples, vehicle 5 may be a hybrid vehicle with multiple sources of torque available to one or more of vehicle wheels 36. In other examples, vehicle 5 is a conventional vehicle with only an engine, or an electric vehicle with only electric machine(s). In the example shown, vehicle 5 includes engine 10 and an electric machine 153. Electric machine 153 may be a motor or a motor/generator. A crankshaft of engine 10 and electric machine 153 are connected via transmission 30 to vehicle wheels 36 when one or more clutches 156 are engaged. In the depicted example, a first clutch 156 is provided between engine 10 and electric machine 153, and a second clutch 156 is provided between electric machine 153 and transmission 30. Controller 12 may send a signal to an actuator of each clutch 156 to engage or disengage the clutch, so as to connect or disconnect engine 10 from electric machine 153 and the components connected thereto, and/or connect or disconnect electric machine 153 from transmission 30 and the components connected thereto. Transmission 54 may be a gearbox, a planetary gear system, or another type of transmission. The powertrain may be configured in various manners including as a parallel, a series, or a series-parallel hybrid vehicle.

Electric machine 153 receives electrical power from battery 46, such as a traction battery, to provide torque to vehicle wheels 36. Electric machine 153 may also be operated as a generator to provide electrical power to charge battery 46, for example during a braking operation to provide what is known as regenerative braking.

In this way, the components of FIG. 1 enable a vehicle system comprising an engine; an accelerator pedal and a brake pedal for receiving operator input; an alternator coupled to the engine; a transmission including an electrically-driven oil pump; an air conditioning system including a compressor for cooling a vehicle cabin; brakes coupled to vehicle wheels, the brakes including a master cylinder receiving brake fluid from a fluid reservoir, the brakes coupled to the brake pedal; and a controller with computer readable instructions stored on non-transitory memory that cause the controller to: responsive to the accelerator pedal being depressed and the brake pedal being released, selecting an engine idle speed based on an estimated engine electrical load; lowering engine speed below than the selected engine idle speed; and in response to the brake pedal being released, increasing the engine speed from the lowered engine speed to at least the selected engine idle speed while increasing a hydraulic brake pressure independent of brake pedal input. The controller may include further instructions for estimating the engine electrical load based on an actual and/or anticipated torque requirement of each of the alternator, the pump, and the compressor, the load increased responsive to alternator operation, pump operation, and cabin cooling demand. In one example, increasing the engine speed includes increasing at a rate based on demand for increased AC compressor power, and wherein the hydraulic brake pressure is increased at a rate based on the rate of increasing the engine speed. Further, increasing the hydraulic brake pressure includes estimating a creep torque associated with the increasing the engine speed; and increasing the hydraulic brake pressure to counteract the estimated creep torque. The creep torque may be estimated as a function of a square of engine speed. In one example embodiment, the selected engine idle speed is at or above a transmission engine synchronous speed.

Figure 2:
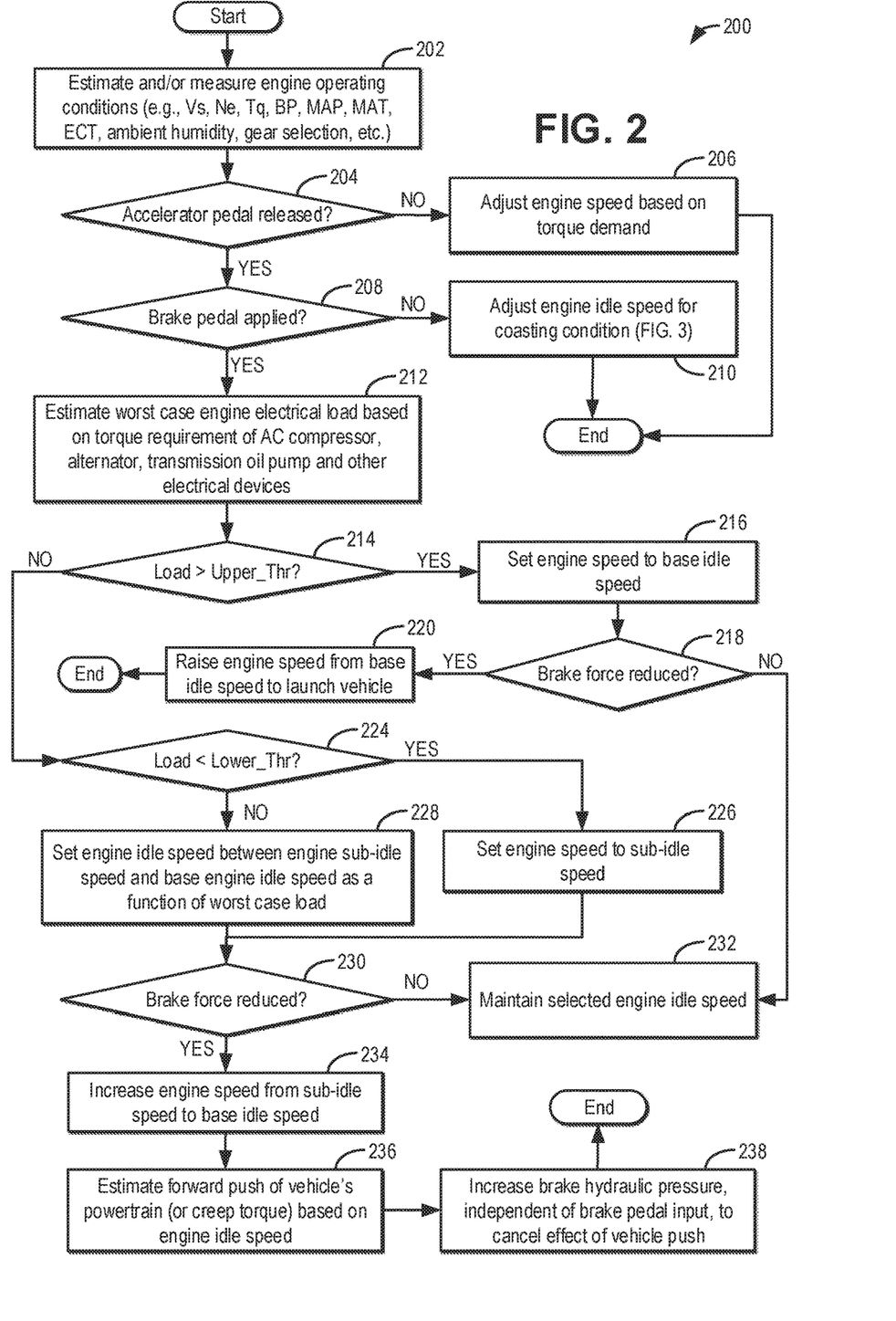
FIG. 2 shows a high level flow chart of an example method for adjusting engine idle speed responsive to brake pedal application and release.

Turning now to FIG. 2, an example method 200 is shown for opportunistically lowering an engine idle speed below a base idle speed, to provide fuel economy benefits. The idle speed is raised when a brake force is reduced by an operator, while applying added hydraulic brake pressure via a controller to counteract creep torque resulting from the engine idle speed increase. While the method of FIG. 2 is performed while a vehicle is brought a halt by application of brake pedals, a similar method for lowering engine idle speed during a coasting operation is shown at FIG. 3. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine and vehicle operating conditions including one or more of engine speed, barometric pressure, torque demand, vehicle speed, manifold temperature and pressure, gear selection, engine coolant temperature, etc. Next it is determined if conditions are met for shifting the engine to idling conditions. Specifically, at 204, it is determined if the accelerator pedal has been released by the vehicle operator. If the accelerator pedal is depressed, then at 206, the method includes adjusting engine speed based on torque demand. For example, engine fueling and air intake is adjusted to provide an engine speed that is able to meet the torque demand, the engine speed required increasing as the torque demand increases.

If the accelerator pedal has been released, then at 208, it is determined if the brake pedal has been applied by the vehicle operator. A vehicle operator may indicate an intention to bring the vehicle to a stationary position by releasing the accelerator pedal and applying the brake pedal, such as when the vehicle approaches a traffic signal. If the brake pedal has not been applied, and only the accelerator pedal has been released, then at 210, it in inferred that the operator wishes to coast the vehicle, and accordingly an engine idle speed setting is selected for the coasting condition. Engine idle speed adjustments during vehicle coasting is elaborated at FIG. 3.

Returning to 208, if the brake pedal has also been applied, in addition to the accelerator pedal being released, then at 212, the method includes estimating the worst case engine electrical load based on a torque requirement of various engine electrical components, such as the AC compressor, alternator, transmission (electric) oil pump, and other electrical devices. For example, the controller may determine an actual load of each component based on current conditions and an anticipated load based on predicted (upcoming) driving conditions, as inferred from navigational input. As non-limiting examples, the AC compressor load may increase as the cabin cooling demand increases, the alternator load may increase as electrical power consumption increases, and the transmission electric oil pump load may increase as the transmission actuation actions are commanded. The controller may determine each electrical load individually, and then sum the loads to determine the worst case load on the engine.

At 214, it is determined if the estimated worst case load is higher than an upper threshold load (Upper_Thr). For example, the worst case load may be compared to a non-zero threshold load above which at least a base engine idle speed is required to be maintained for the load to be supported without stalling the engine). If the load is higher than the upper threshold, then at 216, the method includes setting the engine speed to the base idle speed. For example, during the current idling condition, engine fueling and air intake is adjusted to maintain the base engine idle speed. In one example, the base engine idle speed is 700 rpm. In still other examples, a higher engine idle speed may be applied responsive to the higher than threshold engine load, such as an engine idling speed of 1200 rpm.

While maintaining the base engine idle speed, at 218, it may be determined if the brake force applied by the vehicle operator has been reduced. For example, it may be determined if the operator has released the brake pedal. If yes, then at 220, the method includes raising the engine idle speed from the base idle speed to an engine speed based on the torque demand so as to launch the vehicle. For example, the engine idle speed may be raised from 700 rpm or to 1200 rpm. By increasing the engine idle speed responsive to the drop in brake force, the vehicle is able to generate a creep torque via the increased engine idle speed. Else, if the brake force has not been reduced, the selected engine idle speed is maintained at 232.

Returning to 214, if the load is below the upper threshold, then at 224, it is determined if the estimated worst case load is below a lower non-zero threshold load (Lower_Thr). For example, the worst case load may be compared to a threshold load below which a new, exceptionally low, minimum idle speed can be maintained for the load to be supported without stalling the engine). As an example, if enough battery state of charge exists, the controller may reduce the alternator electrical power production to zero or negative. In the case that the alternator is a motor/generator, it can function as a motor, thus supplementing engine torque, allowing for an exceptionally low engine idle speed. In one example, the worst case load may be below than the lower threshold load when the air conditioner (AC) of the HVAC system is powered off (due to no cabin cooling being demanded by the operator), and while the other electrical loads of the alternator and the transmission pump are at a minimum. The new minimum idle speed, hereafter, is also referred to as a sub-idle engine speed. The lower engine idle speed allows for an improvement in fuel economy during engine idling. If the load is below the lower threshold, then at 226, the method includes setting the engine speed to the sub-idle engine speed. For example, during the current idling condition, engine fueling and air intake is reduced to maintain the sub-idle engine speed. In one example, the sub-idle engine speed is 400 rpm. By lowering the engine idle speed to a non-zero sub-idle speed, instead of to a zero idle speed, a time-to-combustion-torque is improved. In particular, if the engine is already spinning at sub-idle speed, a time-to-combustion-torque is very short, thereby reducing delays in vehicle responsiveness to a requested combustion-powered longitudinal motion. The delay may be longer as the engine idle speed is reduced to a zero idle speed. The longer delay may cause driver dissatisfaction.

Returning to 224, if the load is between the upper and lower threshold loads, then at 228, the method includes setting the engine idle speed to a speed that is in-between the engine sub-idle speed and the base engine idle speed as a function of the estimated worst case load. For example, as the worst case load decreases, the selected engine idle speed may be moved towards the sub-base idle speed. In comparison, as the worst case load increases, the selected engine idle speed may be moved towards the base engine idle speed. In one example, the controller may receive the worst case load as input and may calculate the corresponding engine idle speed via a model, algorithm, or look-up table. In this way, the engine idle speed may be opportunistically lowered, when electrical load is at a minimum and while an AC is powered off. Specifically, by lowering the engine idle speed to or towards a sub-idle speed, when possible, an exceptionally low idle speed can be achieved, thereby providing a fuel economy improvement at zero variable cost.

From each of 224 and 226, the method moves to 230 where it is determined if the brake force applied by the vehicle operator has been reduced. For example, it may be determined if the operator has fully or partially released the brake pedal. If yes, then at 234, the method includes raising the engine idle speed from the sub-idle speed (or from between the base idle speed and sub-idle speed) to the base idle speed. For example, the engine idle speed may be raised from 400 rpm to 700 rpm. Else, if the brake force has not been reduced, the selected engine idle speed is maintained at 232.

From 234, the method moves to 236 to estimate a forward push of the vehicle's powertrain (or creep torque) based on the change in engine idle speed. In particular, the rise in engine idle speed can result in unintended vehicle motion or acceleration, also referred to as creep. The controller may calculate the anticipated creep torque (or vehicle speed, or vehicle acceleration) based on the change in engine idle speed. For example, the creep torque may be calculated based on the magnitude of change in engine idle speed (such as from the sub-idle speed to the base idle speed) as well as the rate of change in engine idle speed (such as based on how rapidly the engine speed is changed from the sub-idle speed to the base idle speed).

Creep torque is that transmission output torque due to engine idle speed resulting in torque transmission across an open (unlocked) torque converter. The effect of this creep torque is normally modulated via the brake pedal. In the present disclosure, the vehicle controller adjusts the brake line pressure to avert operator-unintended increases in effective creep torque at the tires. This allows the use of lower idle speeds than otherwise possible because idle speed can be raised if needed. Further, if the idle speed is raised, it does not come with an unintended increase in effective creep torque.

At 238, the method includes increasing a brake hydraulic pressure, independent of brake pedal input, to cancel the effect of the vehicle push. Specifically, brake hydraulic pressure is increased, even while the brake pedal is released, to counteract the dynamically changing (increasing) creep torque. This prevents the rising engine idle speed from actually increasing creep torque and affecting the intended braking rate or causing vehicle motion when a vehicle is stopped. The increase in brake hydraulic pressure is adjusted as a function of the estimated increase in vehicle creep torque. Thus, as the anticipated creep torque increases, the brake hydraulic pressure is correspondingly increased. For example, as the magnitude of the expected rise in creep torque increases, the magnitude of hydraulic brake pressure rise is increased. Likewise, as the rate of rise of anticipated creep torque increases, the magnitude of hydraulic brake pressure rise is increased. In one example, the controller may provide the change in engine idle speed as an input to an algorithm, model, or look-up table, and receive a desired increase in hydraulic brake pressure as an output. The controller may then send a control signal to the hydraulic brake system (such as a command to the piston coupled to the master cylinder of the hydraulic brake system) to affect the desired change in brake pressure. It will be appreciated that in this situation, the hydraulic brake pressure is increased without receiving brake pedal input. That is, brake hydraulic pressure is increased even though the brake pedal is not being depressed (as the operator is not requested vehicle wheel braking explicitly). Instead, the hydraulic brake pressure is increased while the brake pedal is released, as the operator indicates an intent to eventually relaunch the vehicle.

Turning now to FIG. 3, an example method 300 is shown for adjusting engine idle speed during a vehicle coasting condition. In one example, the method of FIG. 3 may be performed as part of the method of FIG. 2, such as at 210. The method enables engine idle speed to be lowered opportunistically during a coasting operation, to improve fuel economy.

At 302, a coasting condition is queried. In one example, a coasting condition is confirmed if a vehicle operator has released the accelerator pedal without depressing the brake pedal, allowing for the vehicle to be moving without accelerator input. The vehicle speed may be gradually decreasing during the coasting as frictional forces are applied on the vehicle and while no engine torque is generated to counteract the frictional forces. If a coasting operation is not confirmed, such as when the operator applies the vehicle's brake pedal, the method moves to 304 to adjust engine idle speed based on the brake pedal status, as elaborated earlier at FIG. 2. The method then ends.

If a coasting condition is confirmed, at 306, the method includes unlocking a torque converter lock-up clutch (TCC) in accordance with a defined torque converter schedule. The schedule may be based on one or more of vehicle speed, engine speed, and torque demand. For example, as the vehicle speed reduces but remains above a threshold speed, the TCC may remain locked. Then, as the vehicle speed drops below the threshold speed, the TCC may be unlocked. As another example, as the vehicle speed drops and the torque demand remains above a threshold demand, the TCC may remain locked. Then when the torque demand drops below the threshold, the TCC may be unlocked. It will be appreciated that the TCC may be unlocked before the engine speed goes below a target minimum engine speed, which may be the sub-idle speed or any other idle speed.

Next, at 308, the method includes setting the engine speed to a base idle speed, such as to 600 or 700 rpm. For example, engine fueling and air intake may be adjusted so that engine speed is at the base idle speed. Next at 310, it is determined if the coasting condition is continuing or if the coasting has come to an end by the operator depressing the brake pedal. If the brake pedal has not been depressed, and the vehicle continues to coast, then at 312, the method includes maintaining the engine speed at the base idle speed. If the operator depressed the brake pedal and indicates and intent to bring the vehicle to a halt, then at 314, the method includes estimating or anticipating the worst case engine electrical load when the vehicle is halted and the engine is idle. As discussed at FIG. 2, the worst case load is estimated based on the torque requirement of the various electrical devices such as the transmission electric oil pump, the AC compressor, the alternator, etc. Then, at 316, the method includes opportunistically reducing the engine idle speed from the base idle speed to an engine speed that is below the engine transmission synchronous speed as a function of the worst case load. The synchronous speed is enforced anytime the TCC is locked. This means that engine speed is equal to transmission input shaft speed. That is, as the estimated worst case load decreases, the engine speed is lowered, from the base idle speed, to a speed that is further below the engine transmission synchronous speed. Herein, the speed below the engine transmission synchronous speed is referred to as a sub-idle speed. In one example, the engine speed may be lowered from 600 rpm to below 400 rpm.

In some examples, the controller may override or delay the need for FEAD torque to prolong engine operation at the sub-idle engine speed. In the current approach, instead of choosing an idle speed based on providing accessory torque at a worst case condition (that is, based on electrical needs that may materialize while at that idle speed), the controller may choose an idle speed based on present accessory power/torque needs, allowing an increase in idle speed if required, but while reducing unanticipated creep torque increases. At 318, it is determined if the brake force applied by the vehicle operator has been reduced. For example, it may be determined if the operator has fully or partially released the brake pedal. If yes, then at 322, the method includes raising the engine idle speed from below the engine transmission synchronous speed to the base idle speed, or to above the engine transmission synchronous speed. For example, the engine idle speed may be raised from 400 rpm to 700 rpm. Else, if the brake force has not been reduced, the reduced engine idle speed is maintained at 320.

From 322, the method moves to 324 to estimate a forward push of the vehicle's powertrain (or creep torque) based on the change in engine idle speed. In particular, the rise in engine idle speed can result in unintended vehicle motion or acceleration, also referred to as creep. The controller may calculate the anticipated creep torque (or vehicle speed, or vehicle acceleration) based on the change in engine idle speed. For example, the creep torque may be calculated based on the magnitude of change in engine idle speed (such as from below the engine transmission synchronous speed to above the engine transmission synchronous speed) as well as the rate of change in engine idle speed (such as based on how rapidly the engine speed is raised).

At 326, the method includes increasing a brake hydraulic pressure, independent of brake pedal input, to cancel the effect of the vehicle push. Specifically, brake hydraulic pressure is increased, even while the brake pedal is released, to counteract the dynamically changing (increasing) creep torque. This prevents the rising engine idle speed from actually increasing creep torque and affecting the intended braking rate or causing vehicle motion when a vehicle is stopped. The increase in brake hydraulic pressure is adjusted as a function of the estimated increase in vehicle creep torque. Thus, as the anticipated creep torque increases, the brake hydraulic pressure is correspondingly increased. For example, as the magnitude of the expected rise in creep torque increases, the magnitude of hydraulic brake pressure rise is increased. Likewise, as the rate of rise of anticipated creep torque increases, the magnitude of hydraulic brake pressure rise is increased. Further, since creep torque increases as a function of the square of engine speed, the hydraulic brake pressure applied responsive to the release of the brake pedal is also adjusted as a function of the square of engine speed.

Torque transmitted through the torque converter is roughly proportional to the square of the speed difference between the engine (impeller) and transmission input (turbine). At zero to low vehicle speeds, this is further approximated to zero turbine speed and thus become sensitive to engine (impeller) speed alone.

In one example, the controller may provide the change in engine idle speed as an input to an algorithm, model, or look-up table, and receive a desired increase in hydraulic brake pressure as an output. The controller may then send a control signal to the hydraulic brake system (such as a command to the piston coupled to the master cylinder of the hydraulic brake system) to affect the desired change in brake pressure. It will be appreciated that in this situation, the hydraulic brake pressure is increased without receiving brake pedal input. That is, brake hydraulic pressure is increased even though the brake pedal is not being depressed (as the operator is not requested vehicle wheel braking explicitly). Instead, the hydraulic brake pressure is increased while the brake pedal is released, as the operator indicates an intent to eventually relaunch the vehicle. In addition, the torque converter is locked according to a locking schedule as the vehicle is launched and the vehicle speed increases.

The inventors herein have recognized that the sub-idle speed (e.g. 400 rpm) allows the vehicle to transition to a "ready-to-accelerate" idle speed (e.g. 700 rpm) upon brake pedal release (that is, on the same conditions as at an engine auto start where the engine is automatically shutdown without operator input). The total fuel consumed between unlocking the torque converter on a 3-2 transmission gear downshift and engine auto-stop is 2% on a given cycle. Lowering the engine idle speed to sub-idle can reclaims at least a portion (e.g., half) of that fuel loss. The in-drive engine idle speed control remains active while the torque converter is unlocked and fuel continues to be supplied to keep the engine running at a speed fast enough to accommodate a driver change-of-mind wherein the operator applies the brake to halt the vehicle and changes their mind mid-way and depresses the accelerator pedal instead. By allowing for an idle speed that is less than engine transmission synchronous speed, the engine controller can quickly go back to the engine synchronous speed upon sensing that the brake pedal application force is reduced, thus seamlessly taking up any lash during the brake pedal to accelerator pedal application period.

In one example implementation, when the vehicle speed is below zero grade creep speed (e.g., below 10 kmph), and the brake pedal is applied, the engine controller may send a control signal to add brake hydraulic pressure, via the hydraulic brake system, in such a way as to counteract the extra wheel torque resulting from the increased idle speed. In the case that the vehicle is stopped, the controller may add sufficient (or excess) brake hydraulic pressure without it being noticed or perceived by the vehicle operator. In another example implementation, the controller may compute the "forward push" of the vehicle's powertrain and add the corresponding brake hydraulic pressure to result in canceling the effect of the vehicle push. This may include estimating the vehicle push resulting from creep torque that increases approximately with the square of engine idle speed. Thus, the hydraulic brake pressure applied in both the methods of FIGS. 2-3 may be adjusted as a function of the square of engine idle speed.

As an example, the engine may be operating at 400 rpm. Responsive to an FEAD load, the engine speed is raised to 700 rpm. The resulting creep torque then is $(400^2)/16{,}000=10$ Nm. The creep torque at 700 rpm is $(700^2)/16{,}000=30$ Nm. Thus, the braking system would be asked to counteract the effective torque resulting from the transmission input net torque increase of 20 Nm. This additional brake torque can be slowly reduced if the vehicle is in motion or completely eliminated if the acceleration is deflected by the operator.

In this way, when a vehicle is stopped, a controller may increase the brake hydraulic pressure, without brake pedal input, to prevent unintended vehicle motion do to an actual or potential increase in creep torque, the creep torque resulting from a sharply increasing engine idle speed. This enables a significant improvement in fuel economy. By increasing the brake hydraulic pressure when the brake pedal is released, without receiving brake pedal input, the dynamically-changing (specifically, increasing) creep torque can be reliably counteracted. This prevents a rising engine idle speed from increasing creep torque and affecting the intended braking rate or causing vehicle motion when stopped. Further, if the torque converter is unlocked (and the engine is maintaining its own speed) and a reduction in brake pedal force or travel occurs, by restoring the engine idle speed to the larger of idle speed needed based on accessory needs and engine synchronous speed, lash take up on an accelerator pedal press is avoided. This reduces NVH and improves vehicle drivability.

Now turning to FIG. 4, a prophetic example of engine idle speed adjustments in shown. Map 400 depicts vehicle speed at plot 402. Accelerator pedal application is shown at plot 406. Going upwards along the y-axis, as the accelerator pedal application increases, the driver demanded torque is inferred to increase. Brake pedal application is shown at plot 408. Going upwards along the y-axis, as the brake pedal application increases, the driver demanded brake torque is inferred to increase. Brake hydraulic pressure applied via a piston on a master cylinder of the brake system is shown at plot 410. Engine speed changes are shown at plot 412, relative to a base idle speed 413. A state of the torque converter (locked or unlocked) is shown at plot 414. Engine electrical load is shown at plot 416. All plots are shown over time along the x-axis.

Prior to t1, the vehicle is being propelled with engine speed adjusted as a function of torque demanded by the vehicle operator. At t1, the operator releases the accelerator pedal and shortly after that, the operator depresses the brake pedal. The combined action indicates that the operator intends to bring the vehicle to a stop, such as may occur due to the vehicle arriving at a traffic signal. Thus at t1, in response to the accelerator pedal release and brake pedal actuation, vehicle speed reduces towards a halt and the engine comes to an idling condition. Also at this time, the electrical load drops, for example, due to the transmission oil pump not operating, and cabin cooling not being requested. Due to the lower electrical load, at t1, the engine idle speed is opportunistically lowered below base engine idle speed 413 as a function of the reduced electrical load. This lowering of engine speed allows for a significant improvement in fuel economy over leaving the engine at the base idle speed in anticipation of electrical load.

At t2, the operator requests a reduction in the brake force by gradually releasing the brake pedal. At this time, the controller infers that the vehicle operator intends to eventually launch the vehicle. Therefore in anticipation of vehicle acceleration, the engine idle speed is rapidly raised to the base idle speed 413 while concurrently increasing a hydraulic brake pressure to counteract any creep torque and unintended vehicle movement induced by the rising engine idle speed. Specifically, even though brake force increase is not requested by the vehicle operator, the brake force is actively increased to counteract the creep torque.

At t3, the operator depresses the accelerator pedal to accelerate the vehicle. The vehicle is launched and the engine speed thereafter changes with torque demand to propel the vehicle. Between t2 and t3, the torque converter is locked in accordance with a schedule that is based on vehicle speed. Therein, the TC is locked while vehicle speed is above threshold 404, and unlocked below threshold 404. Also after t3, the electrical load on the engine gradually increases, such as due to transmission oil pump operation and/or cabin cooling demand requiring operation of an AC compressor.

Between t3 and t4, as before t1, the vehicle is propelled with engine speed adjusted as a function of torque demand. At t4, the operator releases the pedal without applying the brake pedal to coast the vehicle towards a halt. In response to the release of the accelerator pedal, the vehicle is moved to an engine idling condition and the engine speed is lowered to and maintained at base idle speed 413. While the vehicle coasts and the vehicle speed drops, the TC is locked according to a schedule based on the vehicle speed. In particular, the TC is moved from locked to unlocked when the vehicle speed falls below threshold 404. Also after t4, while the vehicle is coasting, the electrical load of the engine decreases, such as due to a drop in cabin cooling demand.

At t5, the operator depresses the brake pedal. A brake hydraulic pressure is increased as a function of the brake input to being the vehicle to a halt. Also at this time, due to the lower electrical load, the engine idle speed is opportunistically lowered below base engine idle speed 413 as a function of the reduced electrical load. In particular, the engine idle speed is lowered below a transmission engine synchronous speed. This lowering of engine speed allows for a significant improvement in fuel economy over leaving the engine at the base idle speed in anticipation of electrical load.

At t6, the operator starts to release the brake pedal, reducing the brake force demand. The controller infers that the vehicle operator intends to eventually launch the vehicle. Therefore in anticipation of vehicle acceleration, the engine idle speed is rapidly raised to an engine speed above the transmission engine synchronous speed, herein to the base idle speed 413, while concurrently increasing a hydraulic brake pressure to counteract any creep torque and unintended vehicle movement induced by the rising engine idle speed. Specifically, even though brake force increase is not requested by the vehicle operator, the brake force is actively increased to counteract the creep torque.

After t6, the vehicle operator applies the accelerator pedal, and the brake pressure is reduced, while engine speed is increased as a function of torque demand to propel the vehicle.

In this way, an engine idle speed can be dynamically lowered based on reduced needs from multiple engine-power accessories, such as the AC compressor, alternator, and transmission oil pump. By controlling the brake hydraulic pressure, via an engine controller, when a vehicle is stationary and the brake pedal is released, the potential negative side-effects of increased powertrain creep torque from a rapidly increased idle speed are reduced. As such, this enables the engine idle speed to be lowered without being constrained by the need to limit a rate of engine idle speed increase. The technical effect is that the effect of creep torque on intended deceleration rate is neutralized or counteracted via a vehicle controller mediated control of brake hydraulic pressure. Then, upon detection of brake pedal force/travel reduction, the engine can be returned to transmission-engine synchronous speed before accelerator pedal application, thus gently taking up the lash and avoiding drivetrain clunk. This allows for a lowered engine speed even in a target engine speed region where a high, fuel consuming idle speed, which is always above the engine synchronous speed, is provided to prevent lash.

One example method comprises: while a vehicle is idling with an engine running, adjusting engine speed to a value that is less than the engine speed required to maintain engine electrical load; and in response to a brake pedal being released, increasing the engine speed while concurrently increasing a hydraulic brake pressure independent of operator brake input. In the preceding example, additionally or optionally, the vehicle idling with the engine running includes an accelerator pedal being released and a brake pedal being depressed by a vehicle operator. In any or all of the preceding examples, additionally or optionally, the adjusting includes lowering the engine speed as the electrical load decreases until a minimum engine idle speed is reached below the engine stalls, and then maintaining the minimum engine idle speed. In any or all of the preceding examples, additionally or optionally, the engine electrical load includes one or more of an actual electrical load and an anticipated electrical load. In any or all of the preceding examples, additionally or optionally, the engine electrical load includes an electrical load of one or more of an air conditioning compressor, a transmission electrical oil pump, and an alternator. In any or all of the preceding examples, additionally or optionally, the engine speed is increased at a rate based on transmission input torque. In any or all of the preceding examples, additionally or optionally, the hydraulic brake pressure is increased as a function of one or more of the rate of increasing the engine speed, and a square of the increased engine speed, and independent of a position of the released brake pedal.

Another example method for operating a vehicle comprises: lowering an engine rotational speed to a first speed that is less than transmission input shaft speed in response to an accelerator pedal being fully released and a brake pedal being applied; and raising the engine rotational speed from the first speed to a second speed that is greater than the transmission input shaft speed in response to the brake pedal being at least partially released. In the preceding example, additionally or optionally, the adjusting further includes: lowering the engine rotational speed to the second speed in response to the accelerator pedal being fully released and a brake pedal not being applied; and then further lowering the engine rotational speed from the second speed to the first speed in response to the brake pedal being applied. In any or all of the preceding examples, additionally or optionally, the method further comprises, increasing hydraulic brake pressure while raising the engine rotational speed from the first speed to the second speed. In any or all of the preceding examples, additionally or optionally, the hydraulic brake pressure is increased as a function of the engine rotational speed, and independent of operator brake pedal input. In any or all of the preceding examples, additionally or optionally, the function is a square function of the engine rotational speed. In any or all of the preceding examples, additionally or optionally, the method further comprises selecting the first speed as a function of engine pumping torque required to meet engine electrical load from each of an alternator, a transmission oil pump, and an air conditioning compressor. In any or all of the preceding examples, additionally or optionally, the first speed is raised towards the second speed as the electrical load increases.

Another example vehicle system comprises: an engine; an accelerator pedal and a brake pedal for receiving operator input; an alternator coupled to the engine; a transmission including an electrically-driven oil pump; an air conditioning system including a compressor for cooling a vehicle cabin; brakes coupled to vehicle wheels, the brakes including a master cylinder receiving brake fluid from a fluid reservoir, the brakes coupled to the brake pedal; and a controller with computer readable instructions stored on non-transitory memory that cause the controller to: responsive to the accelerator pedal being depressed and the brake pedal being released, select an engine idle speed based on an estimated engine electrical load; lower engine speed below than the selected engine idle speed; and in response to the brake pedal being released, increase the engine speed from the lowered engine speed to at least the selected engine idle speed while increasing a hydraulic brake pressure independent of brake pedal input. In the preceding example, additionally or optionally, the controller includes further instructions for estimating the engine electrical load based on an actual and/or anticipated torque requirement of each of the alternator, the pump, and the compressor, the load increased responsive to alternator operation, pump operation, and cabin cooling demand. In any or all of the preceding examples, additionally or optionally, the hydraulic brake pressure is increased at a rate based on a rate of increasing the engine speed. In any or all of the preceding examples, additionally or optionally, increasing the hydraulic brake pressure includes estimating a creep torque associated with the increasing the engine speed; and increasing the hydraulic brake pressure to counteract the estimated creep torque. In any or all of the preceding examples, additionally or optionally, the creep torque is estimated as a function of a square of engine speed. In any or all of the preceding examples, additionally or optionally, the selected engine idle speed is at or above a transmission engine synchronous speed. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
lowering an engine rotational speed to a first target non-zero speed that is less than transmission input shaft speed in response to an accelerator pedal being fully released and a brake pedal being applied; and
raising the engine rotational speed from the first speed to a second speed that is greater than the transmission input shaft speed in response to the brake pedal being at least partially released.

2. The method of claim 1, wherein the adjusting further includes:
lowering the engine rotational speed to the second speed in response to the accelerator pedal being fully released and a brake pedal not being applied; and
then further lowering the engine rotational speed from the second speed to the first speed in response to the brake pedal being applied.

3. The method of claim 1, further comprising, increasing hydraulic brake pressure while raising the engine rotational speed from the first speed to the second speed.

4. The method of claim 3, wherein the hydraulic brake pressure is increased as a function of the engine rotational speed, and independent of operator brake pedal input.

5. The method of claim 4, wherein the function is a square function of the engine rotational speed.

6. The method of claim 1, further comprising, selecting the first speed as a function of engine pumping torque required to meet engine electrical load from each of an alternator, a transmission oil pump, and an air conditioning compressor.

7. The method of claim 6, wherein the first speed is raised towards the second speed as the electrical load increases.

* * * * *